3,813,395
4-ARYL ALKYL PIPERAZINO THIENOBENZO
THIAZEPINES
Michio Nakanishi, Oita, Tomohiko Munakata and Shinro Setoguchi, Fukuoka, and Sunao Fukunari, Oita, Japan, assignors to Yoshitomi Pharmaceutical Industries, Ltd., Osaka, Japan
No Drawing. Filed May 13, 1971, Ser. No. 143,179
Claims priority, application Japan, May 13, 1970, 45/41,180, 45/41,181
Int. Cl. C07d 51/70
U.S. Cl. 260—268 TR    6 Claims

ABSTRACT OF THE DISCLOSURE

A thienobenzothiazepine compound of the formula:

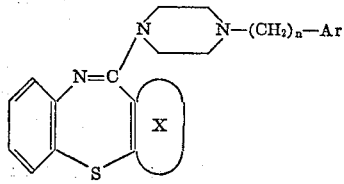

wherein Ar is a member selected from the group consisting of a phenyl, pyridyl and thienyl group; $n$ is 1 or 2; and X is a thiophene ring, the condensed ring system containing said thiophene ring being a member selected from the group consisting of a thieno[2,3-b][1,5]benzothiazepine and a thieno[2,3-b][1,5]benzothiazepine; and the pharmaceutically acceptable acid addition salts thereof. The present invention also extends to a process for making the aforementioned compounds, a pharmaceutical composition containing said compounds and a method for treating psycho disorders by employing said compound.

BACKGROUND OF THE INVENTION

Field of the invention

This invention relates to novel and therapeutically valuable thienobenzothiazepine compounds.

SUMMARY OF THE INVENTION

More particularly, this invention is directed to novel thienobenzothiazepine derivatives of the formula:

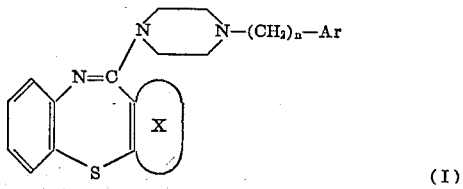

and their pharmaceutically acceptable acid addition salts, wherein Ar is phenyl, pyridyl or thienyl, $n$ is 1 or 2, and ring X is a thiophene ring, the condensed ring system containing said thiophene ring is either a thieno[2,3-b][1,5]benzothiazepine, as illustrated by structure (Ia), or a thieno[3,2-b][1,5]benzothiazepine, as noted by structure (Ib), both of which are shown below:

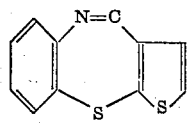 (Ia)   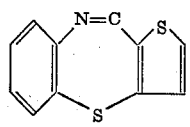 (Ib)

DETAILED DESCRIPTION OF THE PRESENT INVENTION

The compounds of formula (I) can be produced by the following method:

(i) By subjecting a compound of the formula:

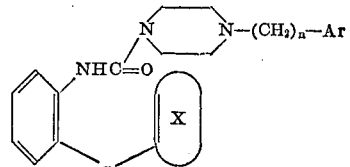

to ring forming dehydration, said Ar, X and $n$ being defined as above.

The ring forming dehydration is usually carried out in the presence of a dehydrating agent, with or without a solvent at from room temperature to refluxing temperature for several to scores of hours. The dehydrating agent may, for example be phosphorus oxychloride, thionyl chloride, phosphorus pentachloride, phosphorus trichloride, phosphorus pentabromide, phosphorus tribromide or polyphosphoric acid. The solvent may, for example, be ethyl ether, isopropyl ether, tetrahydrofuran, dioxane, benzene, toluene, xylene, pentane, hexane, heptane, methylene chloride, chloroform, dichloroethane or carbon tetrachloride. An excess of the dehydrating agent may serve as a solvent as well.

(ii) By reacting a compound of the formula:

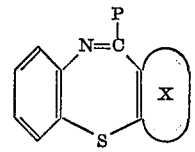

with a compound of the formula:

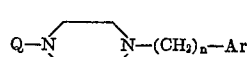

wherein P is a reactive atom or group, such as a halogen atom (Cl, Br, I), an alkyl- or aryl-sulfonyloxy group (e.g. methylsulfonyloxy, p-tolylsulfonyloxy), or an alkyl- or aralkyl-thio group (e.g. methylthio, benzylthio, p-nitrobenzylthio), Q is H or an alkali metal (preferably Na), and X, Ar and $n$ are defined as above.

The reaction is usually carried out with or without a solvent in the presence or absence of a deacidifying agent at from room temperature to refluxing temperature for several to scores of hours. The solvent may, for example, be methyl ether, ethyl ether, dioxane, tetrahydrofuran, pentane, hexane, petroleum ether, ligroin, methanol, ethanol, isopropanol, methyl acetate, ethyl acetate, isopropyl acetate, dimethylformamide or dimethyl sulfoxide or a mixture thereof. The deacidifying agent may, for example, be an alkali metal carbonate, such as potassium carbonate or sodium carbonate, or a tertiary amine, such as triethylamine or pyridine. An excess of the tertiary amine may serve as a solvent and an excess of the compound (IV) as a deacidifying agent.

The compounds (I) can be converted into pharmaceutically acceptable acid addition salts by treatment with, for example, hydrochloric, sulfuric, nitric, oxalic, maleic, fumaric, citric or tartaric acid.

The starting compounds (II) are new compounds and can be produced, for example, by reacting a compound of the formula:

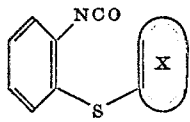

with a compound of the formula:

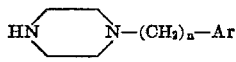

wherein X, Ar and $n$ are as defined above.

Specific examples of the preparation of the starting compounds (II) are as follows:

(1) o-(2-thienylthio)phenyl isocyanate (2.3 g.) is dissolved in 10 ml. of anhydrous benzene, 4.5 g. of N-(2-thenyl) piperazine is added, and the resulting mixture is refluxed for 2 hours. The solvent is then distilled off under reduced pressure, and the residual oil is crystallized from a mixture of acetone and hexane to give 3.7 g. (90%) of 4-(2-thenyl)-1-piperazinecarboxylic acid o-(2-thienylthio) anilide, appearing as white crystals and melting at 104–105° C.

The following starting compounds (II) are also produced similarly:

(a) 4-(2-thenyl)-1-piperazinecarboxylic acid o-(3-thienylthio)anilide, melting at 94° C.;
(b) 4-benzyl-1-piperazinecarboxylic acid o-(2-thienylthio) anilide, melting at 114–116° C.;
(c) 4-phenethyl-1-piperazinecarboxylic acid o-(2-thienylthio)anilide, melting at 95° C.;
(d) 4-[2-(2-pyridyl)ethyl]-1-piperazinecarboxylic acid o-(3-thienylthio)anilide, melting at 81° C.;
(e) 4-(2-pyridylmethyl)-1-piperazinecarboxylic acid o-(2-thiethylthiol)anilide, melting at 68–69° C.;
(f) 4-[2-(2-pyridyl)ethyl]-1-piperazinecarboxylic acid o-(2-thienylthio)anilide, melting at 81° C.; and
(g) 4-[2-(4-pyridyl)ethyl]-1-piperazinecarboxylic acid o-(2-thienylthio)anilide, melting at 97–99° C.

The starting compounds (III) can be produced, for example, by the method described in Netherlands Patent Application No. 6707746, corresponding to U.S. Pat. No. 3,740,099, and Belgian Pat. No. 724,724, corresponding to U.S. Pat. No. 3,641,031.

The compounds of formula (I) and pharmaceutically acceptable acid addition salts thereof exhibit excellent pharmacological activity in suppression of spontaneous motility, suppression of fighting behavior, reserpine potentiation and narcosis potentiation as shown, for example, by the following tests.

The test for suppression of spontaneous motility was performed according to the method described by P. B. Dews in *British Journal of Pharmacology*, Vol. 8, page 46 et seq. (1953); the test for suppression of fighting behavior was made according to the method described by R. E. Tedeschi in *Journal of Pharmacology and Experimental Therapeutics*, Vol. 125, page 28 et seq. (1959); the test for reserpine potentiation was done according to the method described by N. D. Aceto in *Toxicology and Applied Pharmacology*, Vol. 7, page 329 et seq. (1965); and the test for narcosis was made according to the method described by M. Nakanishi in *Arzneimittel-Forschung*, Vol. 21, page 391 et seq. (1971).

The $ED_{50}$ in the test for suppression of spontaneous motility is defined as the intraperitoneal dose required to suppress 50% of spontaneous motility; the $ED_{50}$ in the test for suppression of fighting behavior is defined as the oral dose required to suppress 50% of fighting pairs; the $PD_{30}$ in the test for reserpine potentiation is defined as the subcutaneous dose required to potentiate the ptosis caused by the administration of reserpine by 30%; and the $PD_{50}$ in the test for narcosis potentiation is defined as the intraperitoneal dose required to potentiate the effect of the administration of hexobarbital by 50%. The animals employed in each test were dd-strain mice weighing 20–25 grams.

Results:

| | Test compound | | | | |
|---|---|---|---|---|---|
| | A | B | C | D | E |
| Suppression spontaneous motility $ED_{50}$, mg./kg. | 1.25–2.5 | 0.31–0.63 | 0.15–0.31 | 0.16–0.31 | 0.63–1.25 |
| Suppression fighting behavior $ED_{50}$, mg./kg. | 40–80 | 5–10 | 10–20 | 40–80 | 40–80 |
| Reserpine potentiation $PD_{30}$, mg./kg. | 0.63–1.25 | 0.08–0.16 | 0.04–0.08 | 0.04–0.08 | 0.16 |
| Narcosis potentiation $PD_{50}$, mg./kg. | 2.5–5 | 0.63–1.25 | 0.63 | 0.32–0.63 | 0.16–0.32 |

The compounds A to E are shown below:

A: 4-[4-(2-pyridylmethyl)-1-piperazinyl]-thieno[2,3-b][1,5]benzothiazepine trihydrochloride B: 4-[4-(2-(4-pyridyl)ethyl)-1-piperazinyl]-thieno[2,3-b][1,5]benzothiazepine trihydrochloride dihydrate C: 4-[4-(2-(2-pyridyl)ethyl-1-piperazinyl]-thieno[2,3-b][1,5]benzothiazepine trihydrochloride monodrate D: 10-[4-(2-(2-pyridyl)ethyl)-1-piperazinyl]-thieno[3,2-b][1,5]benzothiazepine trihydrochloride monodrate E: 10-[4-(2-(4-pyridyl)ethyl)-1-piperazinyl]-thieno[3,2-b][1,5]benzothiazepine trihydrochloride dihydrate In view of the various tests set out above, the compounds of formula I) and pharmaceutically acceptable acid addition salts thereof can be administered safely as psychotropic agents for the treatment of schizophrenia, mania, depression and neurosis, in the form of a pharmaceutical preparation with a suitable and conventional carrier or adjuvant, administrable orally, without harm to the patients so treated.

The pharmaceutical preparations can take any conventional form, such as tablets, capsules or powders.

Formulation examples 25 mg. tablets are prepared from the following composition:

| | Mg. |
|---|---|
| Compound (I) | 25 |
| Lactose | 70 |
| Microcrystalline cellulose | 8 |
| Starch | 13 |
| Talc | 3 |
| Magnesium stearate | 1 |
| | 120 |

10% powders are prepared from the following composition:

| | Percent |
|---|---|
| Compound (I) | 10 |
| Lactose | 70 |
| Starch | 18 |
| Methyl cellulose | 2 |
| | 100 |

The oral daily dose of Compound (I) or a salt thereof for human adults usually ranges from about 100 to 200 milligrams, in a single or multiple dose.

The present invention will be better understood from the following examples, which are merely intended to be illustrative and not limitative of the present invention.

EXAMPLE 1

4-(2-thenyl)-1-piperazinecarboxylic acid o-(2-thienylthio)anilide (2 g.) is added to 40 ml. of phosphorus oxychloride, and the resulting mixture is heated under reflux on an oil bath for 15 hours. After cooling, the excess phosphorus oxychloride is distilled off under reduced pressure, the residue is treated with ice water, and the aqueous solution is made alkaline with ammonia and extracted with ether. The ether layer is extracted with hydrochloric acid, and the hydrochloric acid layer is made alkaline with ammonia and then extracted with toluene. The toluene layer is washed with water, dried and concentrated. To the remaining oil is added ethanolic hydrochloric acid. The crystals precipitated are collected by filtration and recrystallized from aqueous ethanol to give 1.8 g. (75%) of 4 - [4 - (2 - thenyl)-1-piperazinyl] - thieno[2,3-b][1,5] benzothiazepine dihydrochloride 1.5 hydrate, melting at 203–204° C. with decomposition.

EXAMPLE 2

4 - [2 - (2 - pyridyl)ethyl]-1-piperazinecarboxylic acid o-(3-thienylthio)anilide (10 g.) is dissolved in 100 ml. of chloroform, 30 g. of phosphorus pentachloride is added, and the resulting mixture is heated under reflux on a water bath for 20 hours. After cooling, the reaction mixture is washed with water and extracted with hydrochloric acid, and the hydrochloric acid layer is made alkaline with ammonia and extracted with toluene. The toluene layer is washed with water, dried and concentrated. To the residual oil is added ethanolic hydrochloric acid. The crystals precipitated are collected by filtration and recrystallized from aqueous isopropanol to give 7.5 g. (62%) of 10-[4-(2-2 - pyridyl)ethyl - 1 - piperazinyl] - thieno[3,2-b][1,5] benzothiazepine trihydrochloride monohydrate, melting at 197–199° C. with decomposition.

EXAMPLE 3

4-benzyl-1-piperazinecarboxylic acid o-(2-thienylthio)-anilide (10 g.) is added to 200 ml. of phosphorus oxychloride, and the resulting mixture is heated under reflux (on an oil bath) for 15 hours. After cooling, the excess phosphorus oxychloride is distilled off under reduced pressure. The residue is treated with ice water and made alkaline with ammonia and then extracted with ether. The ether layer is extracted with hydrochloric acid, the hydrochloric acid layer is made alkaline with ammonia, and the alkaline layer is extracted with toluene. The toluene layer is washed with water, dried and concentrated. To the residual oil is added ethanolic hydrochloric acid. The crystals precipitated are collected by filtration and recrystallized from aqueous ethanol to give 9 g. (75%) of 4-(4 - benzyl-1-piperazinyl)-thieno[2,3-b][1,5]benzothiazepine dihydrochloride 0.5 hydrate, melting at 219–220° C. with decomposition.

EXAMPLE 4

N-(2-thenyl)piperazine (4.4 g., 0.02 mole) is added dropwise with stirring to a mixture of 6.5 g. (0.02 mole) of 4-chloro-thieno[2,3-b][1,5]benzothiazepine, 10 g. of potassium carbonate in 60 ml. of dimethylformamide and 30 ml. of tetrahydrofuran, and the resulting mixture is heated under reflux for 8 hours. The solvent is then distilled off, the residue is poured into water, and the aqueous solution is extracted with benzene. The benzene layer is dried over potassium carbonate, and the benzene is distilled off under reduced pressure. The residual oil is dissolved in isopropanol, and an ethanolic hydrochloric acid is added. The crystals precipitated are collected by filtration and recrystallized from isopropanol to give 4.5 g. (45%) of 4-[4-(2-thenyl)-1-piperazinyl]-thieno[2,3-b][1,5]benzothiazepine dihydrochloride 1.5 hydrate, melting at 203–204° C. with decomposition.

EXAMPLE 5

N-[2-(2-pyridyl)ethyl]piperazine (3.8 g., 0.02 mole) is added to a solution of 5.3 g. (0.02 mole) of 4-methylthiothieno[2,3-b][1,5]benzothiazepine in ethanol, and the resulting mixture is heated under reflux for 48 hours. The ethanol is then distilled off, and an ethanolic hydrochloric acid is added to the residue. The crystals precipitated on cooling are collected by filtration and recrystallized from isopropanol to give 8.5 g. (81%) of 4-[4-(2-(2-pyridyl)ethyl)-1-piperazinyl]-thieno[2,3 - b][1,5]benzothiazepine trihydrochloride monohydrate, melting at 201–203° C. with decomposition.

EXAMPLE 6

A mixture of 7.7 g. (0.02 mole) of 10-p-nitrobenzylthiothieno[3,2-b][1,5]benzothiazepine and 7.1 g. (0.04 mole) of N-(2-pyridylmethyl)piperazine is heated at 150° C. (on an oil bath) for 5 hours. After cooling, the reaction mixture is dissolved in benzene, the benzene solution is washed several times with 10% sodium carbonate solution and then with water, and dried over potassium carbonate. Then the benzene is distilled off under reduced pressure. The residue is dissolved in ethanol, and an equivalent amount of fumaric acid is added to provide 10 g. (87%) of 10-[4-(2-pyridylmethyl)-1-piperazinyl]-thieno[3,2-b][1,5]benzothiazepine 1.5 fumarate 0.5 hydrate, melting at 137–139° C.

Using the procedures set forth in the above Examples 1 to 3 or 4 to 6, the following compounds are also produced:

(1) 4-(4-phenethyl-1-piperazinyl) - thieno[2,3 - b][1,5] benzothiazepine dihydrochloride, melting at 275–278° C. with decomposition;
(2) 10-(4-benzyl-1-piperazinyl)-thieno[3,2 - b][1,5]benzothiazepine dihydrochloride 1.5 hydrate, melting at 220° C.;
(3) 4-[4-(2-pyridylmethyl)-1-piperazinyl]-thieno[2,3 - b] [1,5]benzothiazepine trihydrochloride, melting at 252–253° C. with decomposition;
(4) 4-[4-(2-(4-pyridyl)ethyl-1-piperazinyl]-thieno[2,3-b] [1,5]benzothiazepine, melting at 129–130° C., and its trihydrochloride dihydrate, melting at 197–198° C.;
(5) 10-[4-(2-thenyl)-1-piperazinyl] - thieno[3,2 - b][1,5] benzothiazepine trihydrochloride 1.5 hydrate, melting at 213–215° C. with decomposition; and
(6) 10-[4-(2(4-pyridyl)ethyl)-1-piperazinyl] - thieno[3,2-b][1,5]benzothiazepine trihydrochloride dihydrate, melting at 144° C. with decomposition.

Although the present invention has been adequately discussed in the foregoing specification and examples included therein, one readily recognizes that various changes and modifications may be made without departing from the spirit and scope thereof.

What is claimed is:
1. The compound 10-[4-(2-(2-pyridyl)ethyl)-1-piperazinyl]-thieno[3,2-b][1,5]-benzothiazepine and the pharmaceutically acceptable acid addition salts thereof.
2. The compound 4-[4-(2-pyridylmethyl)-1-piperazinyl]-thieno[2,3-b][1,5]-benzothiazepine and the pharmaceutically acceptable acid addition salts thereof.
3. The compound 4 - [4 - (2 - (2 - pyridyl)ethyl)-1-piperazinyl]thieno[2,3-b][1,5]-benzothiazepine and the pharmaceutically acceptable acid addition salts thereof.
4. The compound 4 - [4 - (2 - (4 - pyridyl)ethyl)-piperazinyl]thieno[2,3-b][1,5] - benzothiazepine and the pharmaceutically acceptable acid addition salts thereof.
5. The compound 10 - [4 - (2 - pyridylmethyl)-1- piperazinyl]-thieno[3,2-b][1,5]-benzothiazepine and the pharmaceutically acceptable acid addition salts thereof.

6. The compound 10 - [4 - (2 - (4 - pyridyl)ethyl)-1-piperazinyl[thieno[3,2-b][1,5] - benzothiazepine and the pharmaceutically acceptable acid addition salts thereof.

References Cited

UNITED STATES PATENTS

| | | | |
|---|---|---|---|
| 3,474,099 | 10/1969 | Renz et al. | 260—268 TR |
| 3,509,154 | 4/1970 | Fouche | 260—268 TR |
| 3,625,974 | 12/1971 | Ueda | 260—268 TR |
| 3,641,031 | 2/1972 | Schindler | 260—268 TR |
| 3,720,677 | 3/1973 | Schindler et al. | 260—268 TR |

OTHER REFERENCES

Hunziker et al.: Helv. Chem. Acta, Vol. 50, pp. 1588–99 (1967).

DONALD G. DAUS, Primary Examiner

U.S. Cl. X.R.

260—268 H, 268 C, 268 FT, 329 S, 329 HS; 424—250